(12) United States Patent
Stewart, Jr.

(10) Patent No.: US 10,667,476 B2
(45) Date of Patent: Jun. 2, 2020

(54) SUSTAINED RELEASE IRRIGATION APPARATUS WITH PIVOTING CAP

(71) Applicant: This Town, LLC, Merced, CA (US)

(72) Inventor: Donald J. Stewart, Jr., Merced, CA (US)

(*) Notice: Subject to any disclaimer, the term of this patent is extended or adjusted under 35 U.S.C. 154(b) by 436 days.

(21) Appl. No.: 15/386,079

(22) Filed: Dec. 21, 2016

(65) Prior Publication Data

US 2017/0188529 A1 Jul. 6, 2017

Related U.S. Application Data

(60) Provisional application No. 62/274,494, filed on Jan. 4, 2016.

(51) Int. Cl.
*A01G 27/04* (2006.01)

(52) U.S. Cl.
CPC .................. *A01G 27/04* (2013.01)

(58) Field of Classification Search
CPC . A01G 27/04; A01G 9/02; A01G 9/04; A01G 9/042; A01G 9/047
USPC ........ 42/79, 80–82, 48.5, 50, 51, 53, 54, 75, 42/39; 47/79, 80–82, 48.5, 50, 51, 53, 47/54, 75, 39
See application file for complete search history.

(56) References Cited

U.S. PATENT DOCUMENTS

| | | | | |
|---|---|---|---|---|
| 1,216,642 A * | 2/1917 | White | .............. | A01G 27/04 47/80 |
| 1,342,786 A * | 6/1920 | White | .............. | A01G 27/04 47/81 |
| 3,769,748 A * | 11/1973 | Goldring | ........... | A01G 27/04 47/80 |
| 4,216,623 A * | 8/1980 | Silver | .............. | A01G 27/02 47/80 |
| 4,287,682 A * | 9/1981 | Browne | ........... | A01G 27/04 47/81 |
| 4,324,070 A * | 4/1982 | Swisher | .......... | A01G 27/04 47/81 |
| 4,343,109 A * | 8/1982 | Holtkamp | ....... | A01G 27/04 47/39 |
| 4,428,151 A * | 1/1984 | Solomon | ......... | A01G 27/04 47/39 |
| 4,527,354 A * | 7/1985 | Sellier | ............ | A01G 27/04 47/81 |
| 4,756,121 A * | 7/1988 | Wild | ................ | A01G 27/02 47/80 |

(Continued)

*Primary Examiner* — John Cooper
(74) *Attorney, Agent, or Firm* — Temmerman Law; Mathew J. Temmerman

(57) ABSTRACT

A sustained release irrigation apparatus for effective water management. The sustained release irrigation apparatus includes a reservoir, a support structure, an absorbent surface, a water permeable top layer and a top opening on the water permeable top layer for filling water in the reservoir. The support structure is positioned on the reservoir and designed to support a potted plant thereon. The absorbent surface is positioned on the support structure and includes an absorbent opening. The top opening positioned on the water permeable top layer receives water from a water source and fills water into the reservoir. The water collected in the reservoir flows upwards to the water permeable top layer and then reaches the soil inside a pot thereby making water available to the roots of the potted plant without any wastage.

29 Claims, 10 Drawing Sheets

(56) References Cited

U.S. PATENT DOCUMENTS

| | | | | |
|---|---|---|---|---|
| 4,807,394 A * | 2/1989 | Lyon | A01G 27/04 | 47/79 |
| 4,885,870 A * | 12/1989 | Fong | A01G 27/06 | 47/79 |
| 5,081,790 A * | 1/1992 | Hinton | A01G 27/04 | 47/81 |
| 5,099,609 A * | 3/1992 | Yamauchi | A01G 27/04 | 47/79 |
| 5,189,835 A * | 3/1993 | Green | A01G 27/04 | 47/80 |
| 5,341,596 A * | 8/1994 | Kao | A01G 27/04 | 47/71 |
| 5,502,924 A * | 4/1996 | Lee | A01G 27/003 | 47/79 |
| 5,581,937 A * | 12/1996 | Jenkins | A01G 9/04 | 47/71 |
| 5,782,035 A * | 7/1998 | Locke | A01G 27/00 | 47/79 |
| 5,921,025 A * | 7/1999 | Smith | A01G 27/06 | 47/48.5 |
| 6,079,156 A * | 6/2000 | Colovic | A01G 27/04 | 47/81 |
| 6,094,862 A * | 8/2000 | Fuchigami | A01G 27/06 | 47/81 |
| 6,138,411 A * | 10/2000 | Lin | A01G 27/02 | 47/65.5 |
| 6,226,921 B1 * | 5/2001 | Kang | A01G 27/06 | 47/81 |
| 7,392,616 B1 * | 7/2008 | Bagby | A01G 9/027 | 47/65.9 |
| 2005/0060934 A1 * | 3/2005 | Gelfer | A01G 27/04 | 47/81 |
| 2005/0246954 A1 * | 11/2005 | Bissonnette | A01H 4/001 | 47/62 A |
| 2006/0032129 A1 * | 2/2006 | Lai | A01G 27/04 | 47/62 R |
| 2008/0110089 A1 * | 5/2008 | Spray | A01G 27/04 | 47/79 |
| 2009/0056219 A1 * | 3/2009 | Csoke | A01G 27/02 | 47/79 |
| 2009/0151246 A1 * | 6/2009 | Watson | A01G 27/005 | 47/79 |
| 2009/0223124 A1 * | 9/2009 | Pasquariello | A01G 27/04 | 47/66.1 |
| 2009/0277085 A1 * | 11/2009 | Stewart | A01G 9/028 | 47/79 |
| 2011/0179708 A1 * | 7/2011 | Stewart | A01G 27/04 | 47/65.9 |
| 2012/0198767 A1 * | 8/2012 | Hansen | A01G 9/02 | 47/81 |
| 2014/0007501 A1 * | 1/2014 | Griebel | A01G 27/003 | 47/48.5 |
| 2014/0130412 A1 | 5/2014 | Ormazabal Ochoa De Chinchetru | A01G 27/02 | 47/79 |
| 2015/0083246 A1 * | 3/2015 | Stanford | A01G 27/003 | 137/558 |
| 2015/0143748 A1 * | 5/2015 | Donnelly | A01G 27/06 | 47/79 |
| 2016/0050861 A1 * | 2/2016 | Abbott | A01G 27/04 | 47/81 |
| 2017/0202160 A1 * | 7/2017 | Holtkamp, Jr. | A01G 22/00 | |

* cited by examiner

SUSTAINED RELEASE IRRIGATION APPARATUS WITH PIVOTING CAP

RELATED APPLICATION

This claims priority from the U.S. provisional application with Ser. No. 62/274,494, and which was filed on Jan. 4, 2016. The disclosure of that application is incorporated herein as if set out in full.

BACKGROUND OF THE DISCLOSURE

Technical Field of the Disclosure

The present disclosure relates generally to the field of irrigation apparatus for water management, and more particularly to a sustained release irrigation apparatus for effective water management.

Description of the Related Art

The overhead irrigation method is a preferred form of administering water and other essential nutrients including delivering dissolved fertilizers to various agricultural products. The overhead irrigation technique is not particularly efficient in terms of water management. For this and other reasons, conventional overhead irrigation methods have considerable drawbacks. One such drawback is the loss of resident water quantity due to rapid drainage of the water. This loss in the water quantity occurs if the irrigation is done on plants grown in a regulated environment such as nurseries, greenhouses, experimental plots and containers. Surface evaporation also causes great loss in the water quantity. Another drawback of overhead irrigation is the growth of algae and other weeds due to logging of water on the top surface of the soil. Other disadvantages include leaching of fertilizers and nutrients from the soil.

An alternative to the overhead irrigation is sub-irrigation methods for watering plants in a regulated environment. Sub-irrigation is a method for irrigating plants from beneath the soil surface. It is often used to grow field crops such as tomatoes, peppers and sugar cane. In addition, plant varieties grown in houses also can be maintained using this type of irrigation. Sub-irrigation reduces the amount of water needed for producing high-quality plants, discharged waste water, and the leaching of nutrients from the soil compared with traditional overhead irrigation systems. Further, the sub-irrigation method is beneficial in watering plants in small areas having many diverse species of plants. In the sub-irrigation method, a water containing structure is flooded until the water level contacts the medium. Once the contact is made, capillary action moves water up through the medium and throughout the container.

Various methods have been developed for irrigating potted plants through a sub-irrigation system. One such method includes a closed irrigation system for irrigating container grown potted plants. The system includes a greenhouse bench having a floor of desired width and length for supporting a plurality of potted plants. This sub-irrigation system is more suitable for large scale plant cultures like green houses, nurseries and flower shops than small scale plant cultures.

Another sub-irrigation system includes water bearing capillary carpet disposed on a supporting surface. A plurality of water permeable pots resting upon and in hydraulic connection with the carpet is provided. The capillary carpet provided is a four-layer capillary carpet. The uppermost layer among the four layers is fixed with the lower layers and cannot be replaced if soiled or damaged.

Yet another sub-irrigation system includes a method for hydraulically isolating a series of capillary mat sections from one another by a water impermeable base membrane, thereby preventing water migration from one section to the next. This method requires an additional dedicated system for supplying water to the sub-irrigation system through drip tubes, feeder tubes or drain lines.

There is thus a need for an irrigation apparatus that is cost effective and reliable. Such a needed apparatus would be effectively utilized for small scale plant cultures. Further, such a needed apparatus would allow a user to easily replace soiled or damaged top layers of the apparatus. This needed apparatus would not require an additional dedicated system for supplying water to the apparatus thereby reducing the bulkiness of the apparatus. Such a needed apparatus would minimize or prevent wasting of water and provide an efficient irrigation water management process. These and other objectives are accomplished by the present invention.

SUMMARY OF THE INVENTION

To minimize the limitations found in the prior art, and to minimize other limitations that will be apparent upon the reading of the specification, the preferred embodiment of the present invention is a sustained release irrigation apparatus for effective water management. The sustained release irrigation apparatus includes a reservoir, a support structure, an absorbent surface, a water permeable top layer and a top opening on the water permeable top layer for filling water in the reservoir. The support structure is positioned on the reservoir and includes a plurality of perforations. The support structure is designed to support a potted plant thereon. The absorbent surface is replaceably positioned on the support structure and includes an absorbent opening. The reservoir includes a base and a ledge. The top opening positioned on the water permeable top layer is designed to receive water from a water source and to fill water into the reservoir. The water collected in the reservoir flows upwards to the water permeable top layer and the soil inside a pot utilizing the capillary action of water. In this way, water is made available to the roots of the potted plant without any wastage. The support structure supports the weight of the pot. The water collected at the reservoir flows upwards to the water permeable top layer and to the soil inside the pot through the at least one hole of the pot. The ledge is configured to form an annular ring having an outer circumference and an inner circumference for replaceably retaining the water permeable top layer on the apparatus. The inner circumference is provided with slots which facilitate insertion and removal of the water permeable top layer from the apparatus. The water permeable top layer can be replaced easily through the slots and without the need to remove the entire apparatus. The top opening is designed to coincide with the absorbent opening of the absorbent surface to facilitate flow of water from the water source to a bottom portion of the reservoir.

In another aspect of the present invention, the sustained release irrigation apparatus has the capability of being filled with water through a cap-like structure provided on the top opening of the water permeable top layer. The cap-like structure can be a press-fit cap. Alternatively, the cap-like structure can be pivotally mounted on the circular opening in the support structure and configured for a flip open action. The flip action of the cap-like structure can be provided by the pressure of flow of the water from a water source. The pivoting cap can be a lever and fulcrum type cap supported by a single pivot point preferably slightly off-center so as to cause the cap to return to a closed position when in its normal state. Upon the application of pressure, the weight of the heavy side of the cap is overcome, lifting that side.

In another configuration of the preferred embodiment, the support structure includes a flat circular lattice. At the center of the lattice, there is an open grid. The bottom surface of the absorbent surface is provided with wick like structures that run through the open grid of the support structure. The area between the open grid and the outside perimeter of the lattice is covered by a thin layer or film of plastic. The support opening is provided in this thin layer through which water is added to the reservoir. The pivotal cap is attached to the support structure to cover the support opening. A perforated wall is provided around the perimeter of the lattice. A support ledge runs along the top of the perforated wall. A leg extends from the center of the lattice to the bottom portion of the reservoir. The length of the leg is such that, when the bottom of the leg rests on the bottom portion of the reservoir, the support ledge sets on the top edge of the reservoir. The leg and the top edge of the reservoir support the support structure. There may be more than one leg. The leg(s) taper towards their bottom so that the support structure is stackable. The wick like structure of the absorbent surface extends through the support structure to the bottom of the reservoir.

In yet another configuration of the preferred embodiment, the support structure is provided with a plurality of platform cells. The top of the platform cells is filled in by a thin layer of plastic to create a flat surface. Each of the platform cells tapers towards its bottom so that the support structure is stackable. The platform cells are arranged and spaced such that the open grid fits in the center of the support structure. The length of the platform cells is such that when the base of the platform cells rests on the bottom portion of the reservoir, the support ledge sets on the top perimeter of the reservoir.

A first objective of the present invention is to provide a sustained release irrigation apparatus for effective water management.

A second objective of the present invention is to provide a sustained release irrigation apparatus which facilitates availability of water to the roots of a potted plant utilizing capillary action of water.

A third objective of the present invention is to provide a sustained release irrigation apparatus which can be used for small scale plant cultures like homes and offices.

A further objective of the present invention is to provide a sustained release irrigation apparatus which allows a user to easily replace soiled or damaged top layer of the apparatus.

A still further objective of the present invention is to provide a sustained release irrigation apparatus which does not require an additional dedicated system for supplying water to the apparatus thereby reducing the bulkiness of the apparatus.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve the understanding of the various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE PREFERRED EMBODIMENT

Figure 1:
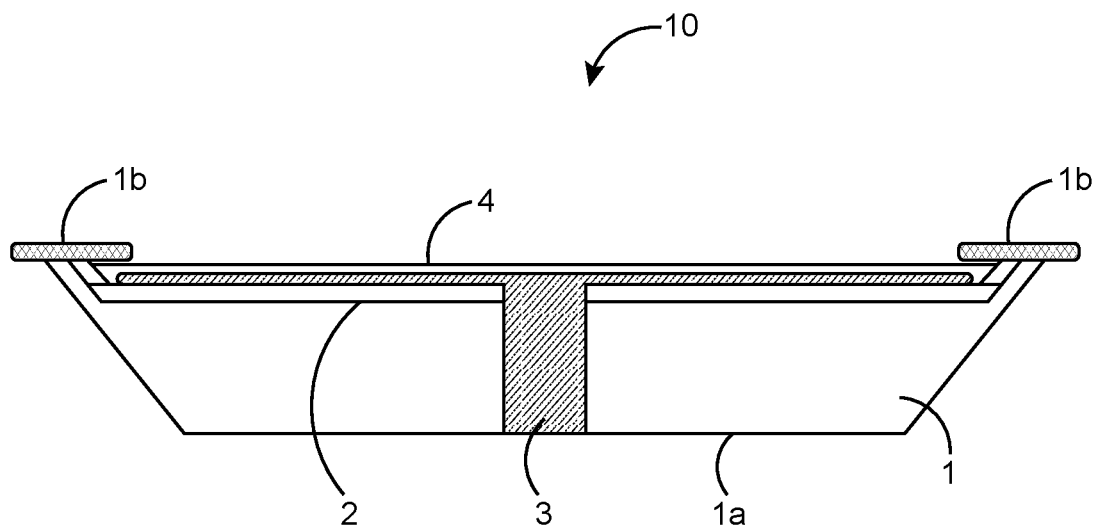
FIG. 1 shows a lateral cross-sectional view of a sustained release irrigation apparatus according to the preferred embodiment of the present invention.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Referring to FIGS. 1-10, a sustained release irrigation apparatus according to the present invention is illustrated in different views and generally designated by the reference numeral 10. The sustained release irrigation apparatus 10 includes a reservoir 1, a support structure 2, an absorbent surface 3, a water permeable top layer 4 and a top opening 4a (see FIG. 2) on the water permeable top layer 4 for filling water into the reservoir 1. The support structure 2 is positioned on the reservoir 1 and includes a plurality of perforations. The support structure 2 is designed to support a potted plant 8 (see FIG. 5) thereon. The absorbent surface 3 is replaceably positioned on the support structure 2 and includes an absorbent opening 3a (see FIG. 3). The reservoir 1 includes a base 1a and a ledge 1b. The ledge 1b does not allow sunlight to enter into the sustained release irrigation apparatus 10 thereby preventing the growth of algae. One example of the reservoir 1 is a trough formed on a plate provided for placing the plant 8 (see FIG. 5). Alternatively, any structure capable of holding a definite quantity of water can be used as the reservoir 1. The reservoir 1 of the apparatus 10 can be of any geometrical shape. The material of the reservoir 1 can be plastic, polypropylene, high-density polypropylene, clay, ceramic, glass, rust resistant metal or other such sturdy materials suitable for holding water.

The top opening 4a (FIG. 2) positioned on the water permeable top layer 4 is designed to receive water from a water source and to fill water into the reservoir 1. The water collected in the reservoir 1 flow upwards to the water permeable top layer 4 and reaches the soil inside a pot 7 (see FIG. 5) utilizing the capillary action of water. In this way, water is made available to the roots of the potted plant 8 (see FIG. 5) without any wastage of water. In the preferred embodiment, the pots 7 with conventional designs, having at least one hole at a lower portion of the pot 7 can be placed on the water permeable top layer 4 of the apparatus 10. The water collected in the reservoir 1 flows upwards to the water permeable top layer 4 through the at least one hole of the pot 7 and finally reaches the soil inside the pot 7.

Figure 2:
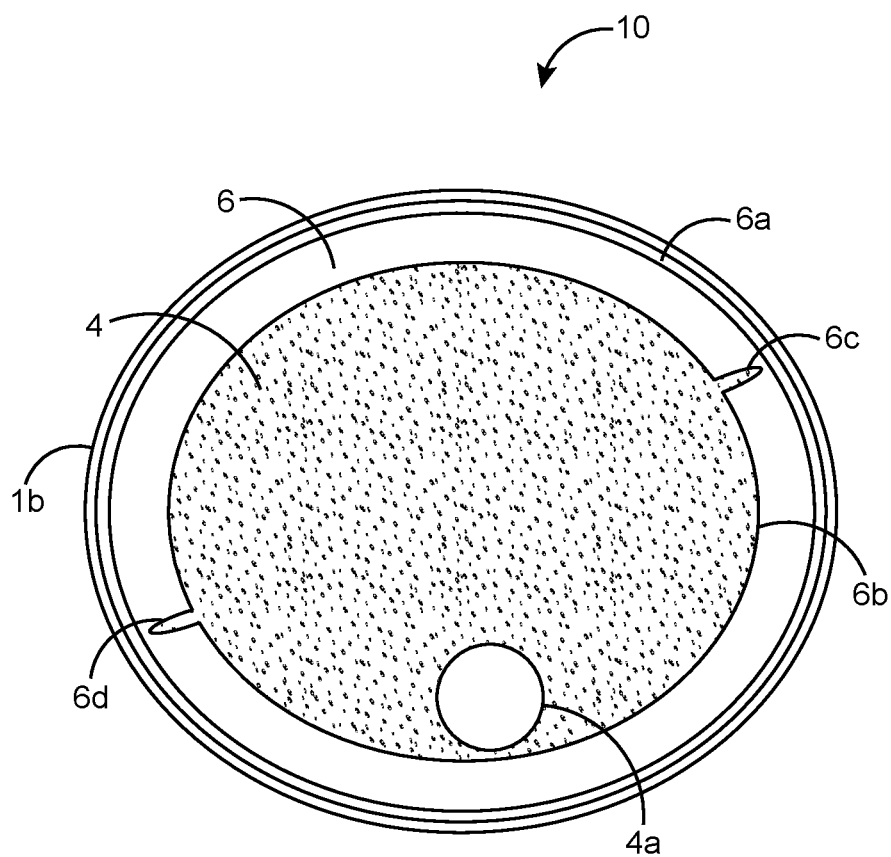
FIG. 2 shows a top view of the sustained release irrigation apparatus according to the preferred embodiment of the present invention.

FIG. 2 shows a top view of the sustained release irrigation apparatus 10. The ledge 1b is configured to form an annular ring 6 having an outer circumference 6a and an inner circumference 6b for replaceably retaining the water permeable top layer 4 on the apparatus 10. The outer circumference 6a has a diameter greater than that of the water permeable top layer 4 and the inner circumference 6b has a diameter less than that of the water permeable top layer 4. The inner circumference 6b is provided with slots 6c and 6d which facilitate insertion and removal of the water permeable top layer 4 from the apparatus 10.

Figure 3:
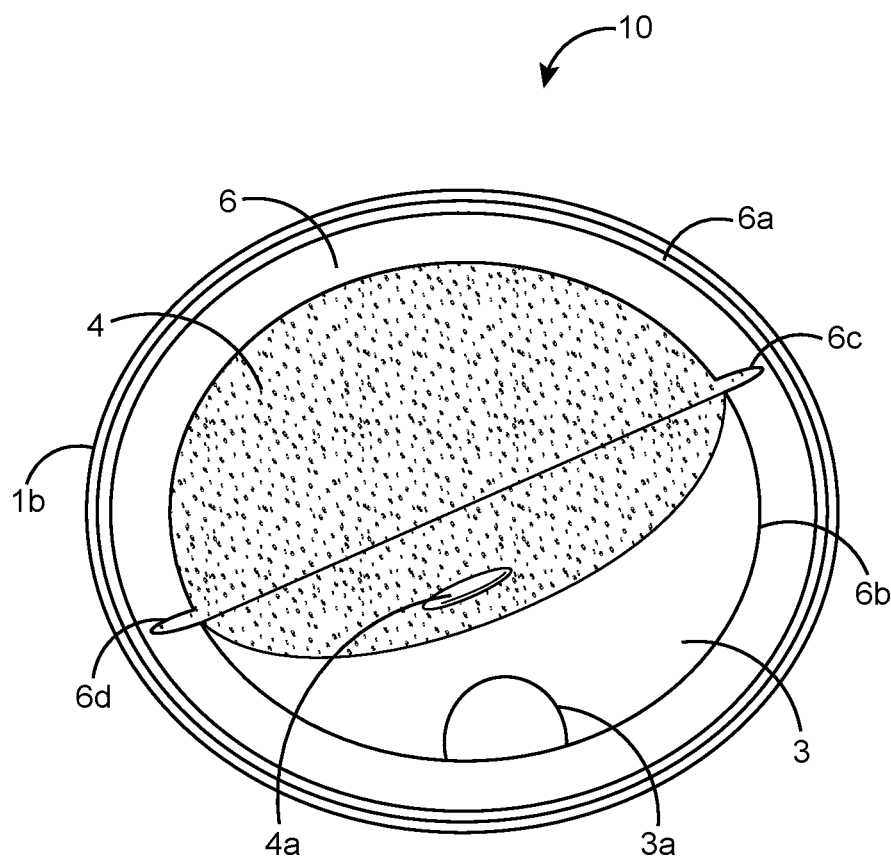
FIG. 3 shows a peeled off section of the sustained release irrigation apparatus according to the preferred embodiment of the present invention.

FIG. 3 shows a peeled off section of the sustained release irrigation apparatus 10. The absorbent opening 3a facilitates access to the reservoir 1. The top opening 4a is designed to coincide with the absorbent opening 3a of the absorbent surface 3 to facilitate flow of water from the water source to a bottom portion of the reservoir 1. The water permeable top layer 4 can be replaced easily through the slots 6c and 6d without the need to remove the entire apparatus 10.

Figure 4:
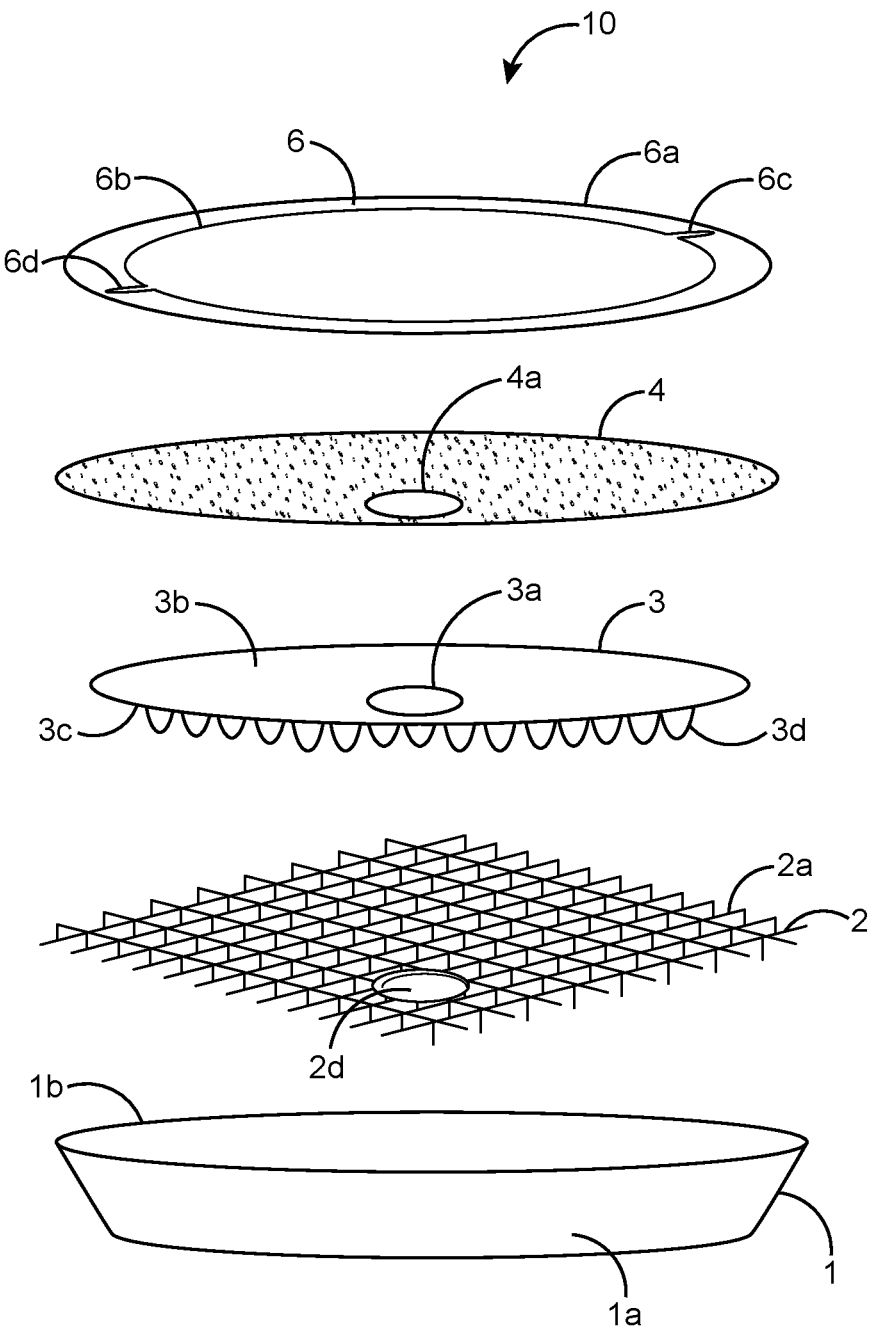
FIG. 4 shows an exploded view of the sustained release irrigation apparatus according to the preferred embodiment of the present invention.

FIG. 4 is an exploded view of the sustained release irrigation apparatus 10 according to the preferred embodiment of the present invention. The exploded view shows the arrangement of the support structure 2, the absorbent surface 3, the permeable top layer 4 and the annular ring 6 on a top perimeter of the reservoir 1. The absorbent surface 3 extends to the bottom portion of the reservoir 1 through the plurality of perforations at the support structure 2. The absorbent surface 3 includes the absorbent opening 3a, a top surface 3b and a bottom surface 3c. The bottom surface 3c of the absorbent surface 3 is provided with wick like structures 3d that runs through a lattice portion 2a of the support structure 2. As shown in FIG. 4, the support structure 2 is positioned below an upper edge of the reservoir 1. The support structure 2 includes a support opening 2d. Examples of support structure 2 include but are not limited to a wire mesh, a griddle and a grid. The dimensions of the absorbent surface 3 are either smaller or equal to that of the support structure 2. The absorbent surface 3 is made of material capable of capillary action and can be formed out of a natural material or a synthetic material. The material for the absorbent surface 3 includes but not limited to cotton, wool, sponge, glass wool, cork, coir fiber or a combination thereof. As shown in FIG. 4, the water permeable top layer 4 is placed on the absorbent surface 3. The dimensions of the water permeable top layer 4 are either equal to or greater than the dimensions of the absorbent surface 3. The water permeable top layer 4 is formed out of synthetic material. One example of the water permeable layer is landscape fabric. The water permeable top layer 4 of the sustained release irrigation apparatus 10 comes in contact with the lower portion of the pot 7 (see FIG. 5).

Figure 5:
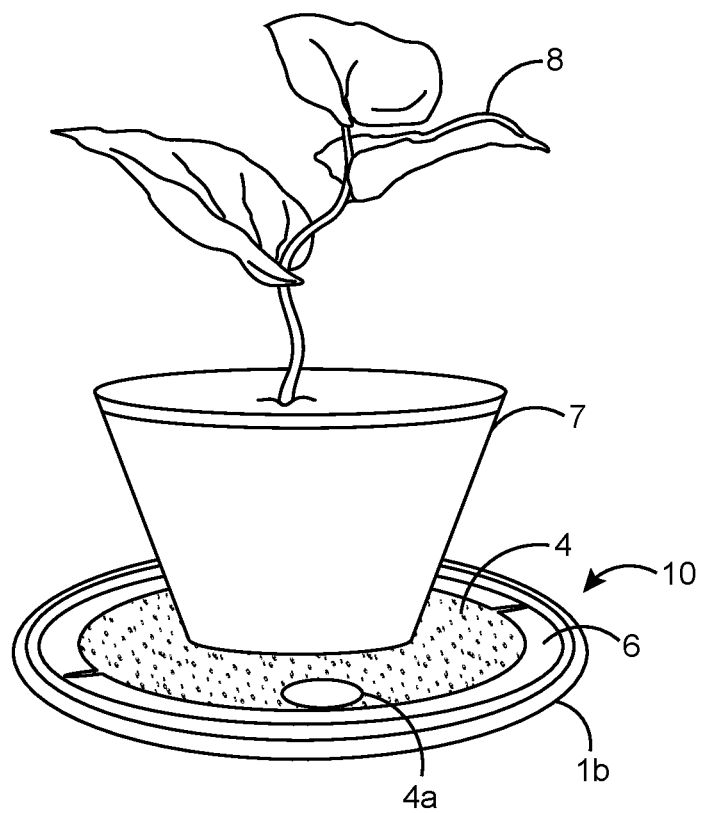
FIG. 5 shows a perspective view of the sustained release irrigation apparatus, illustrating a potted plant positioned on a water permeable top layer of the sustained release irrigation apparatus according to the preferred embodiment of the present invention.

As shown in FIG. 5, any potted plant 8 having the at least one hole at the lower portion of the pot 7 may be put at any position on the water permeable top layer 4 of the sustained release irrigation apparatus 10. The support structure 2 supports the weight of the pot 7. By the capillary action of the absorbent surface 3, water from the reservoir 1 reaches the water permeable top layer 4 of the sustained release irrigation apparatus 10. The water from the water source passes through the top opening 4a, then through the at least one hole on the pot and finally flows upwards to the soil and the roots of the plant 8 utilizing the capillary action of water.

Figure 6:
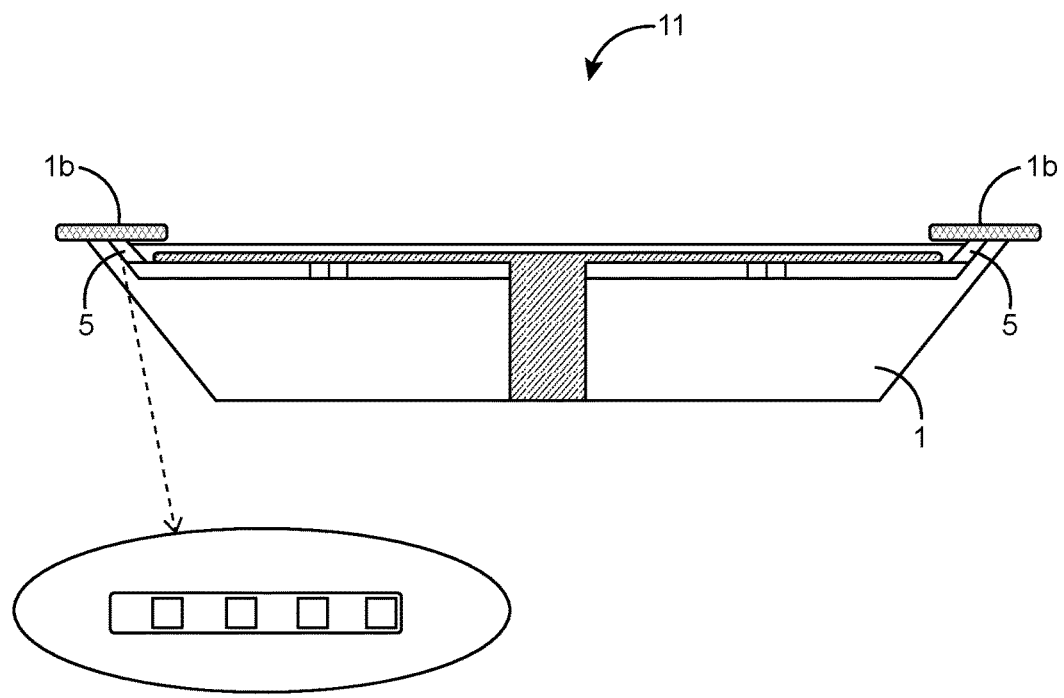
FIG. 6 shows a lateral cross-sectional view of another configuration of the present invention, illustrating a circular wall provided below a ledge of a reservoir of the sustained release irrigation apparatus.

FIG. 6 shows another configuration of the preferred embodiment in which the sustained release irrigation apparatus 11 includes a circular wall 5 below the ledge 1b. The circular wall 5 is formed out of solid material alternating with spaces along its entire circumference. The construction results in formation of a perforated wall. The perforated wall helps in filling water in the reservoir 1. In this embodiment, the water is poured directly on top of the permeable top layer 4 where it drains between the water permeable top layer 4 and the ledge 1b, through the perforated wall that the ledge 1b sets on and then down into the reservoir 1.

Figure 7:
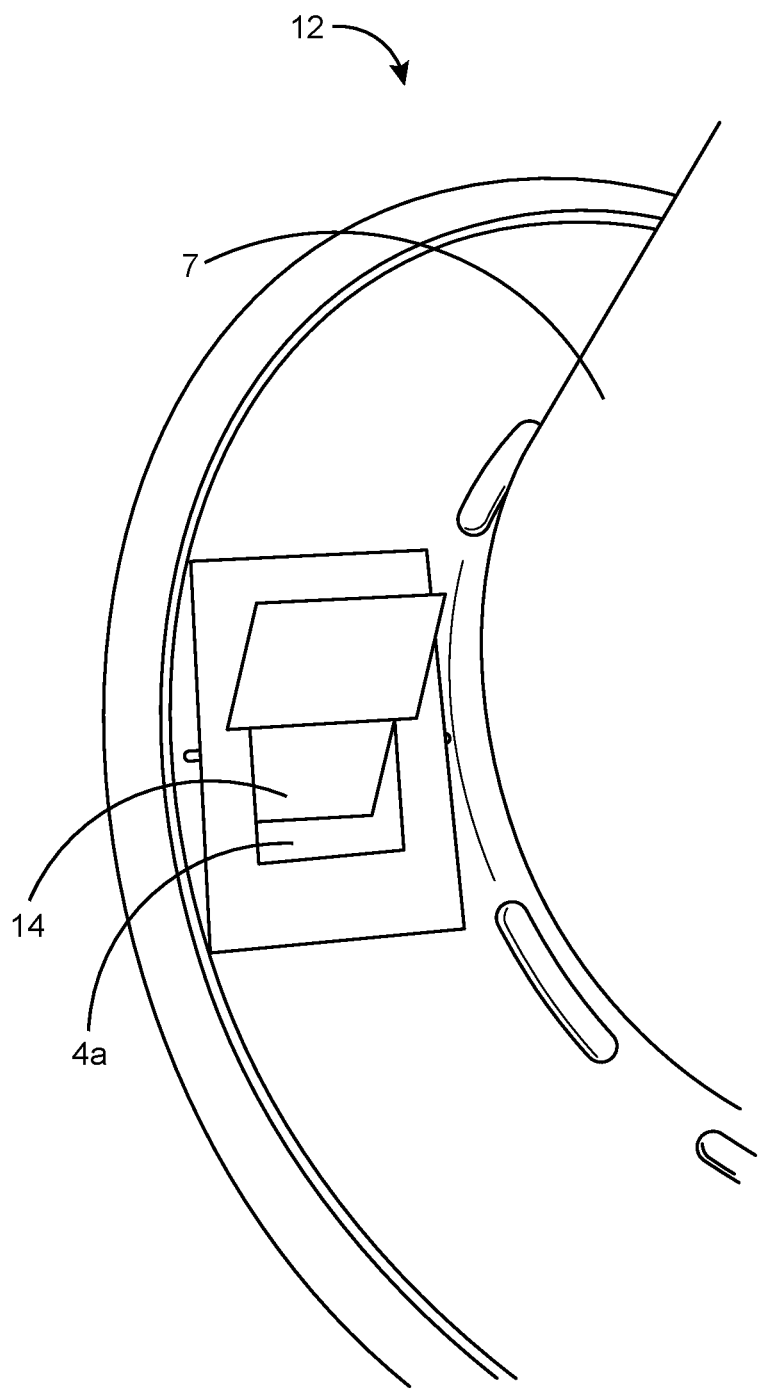
FIGS. 7 and 8 show perspective views of another configuration of the present invention, illustrating a cap-like structure for filling water in the reservoir of the sustained release irrigation apparatus.
Figure 8:
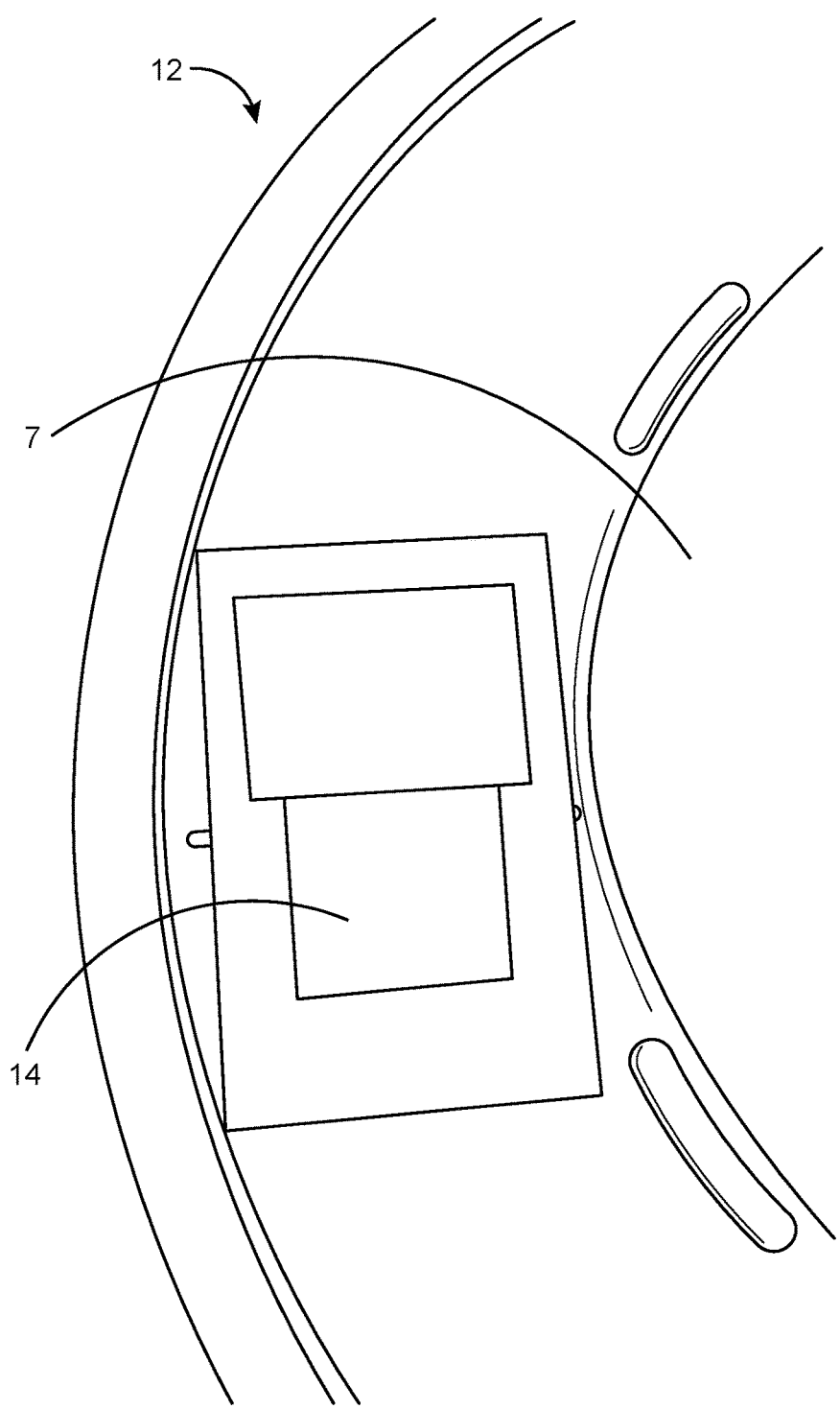

FIGS. 7 and 8 show another configuration of the sustained release irrigation apparatus 12 which enables to fill water through a cap-like structure 14 provided on the top opening 4a of the water permeable top layer 4. The cap-like structure 14 can be a press-fit cap. Alternatively, the cap-like structure 14 can be pivotally mounted on the circular opening 2d in the support structure 2 and configured for a flip open action. The flip action of the cap-like structure 14 can be provided by the pressure of flow of the water from a water source. The pivoting cap 14 is shown as a lever and fulcrum type cap supported by a single pivot point preferably slightly off-center so as to cause the cap 14 to return to a closed position as shown in FIG. 8 when in its normal state. Upon the application of pressure (preferably by water or by a watering wand itself), the weight of the heavy side of the cap 14 is overcome, lifting that side as shown in FIG. 7. The cap 14 is shown as a rectangular structure in FIGS. 7 and 8, but may be circular, ovoid, or any other shape so long as it provides for a single pivot point and a self-closing action based on either the relative weights of the two sides of the cap 14 and/or the location of the pivot point.

In another aspect of the preferred embodiment, a bottom surface of the annular ring 6 includes a plurality of annular ring perforations (not shown) such that when water is poured on the water permeable top layer 4, it enters the reservoir 1 through the plurality of annular ring perforations on the bottom surface of the annular ring 6.

In yet another aspect of the present invention, the sustained release irrigation apparatus 10 is provided with an indicator for alerting the user for replenishment of the water in the reservoir 1. One example of the indicator is a visual indicator, wherein the visual indicator is a water absorbent indicator capable of changing color upon depletion of water below a certain level in the reservoir 1.

Figure 9:
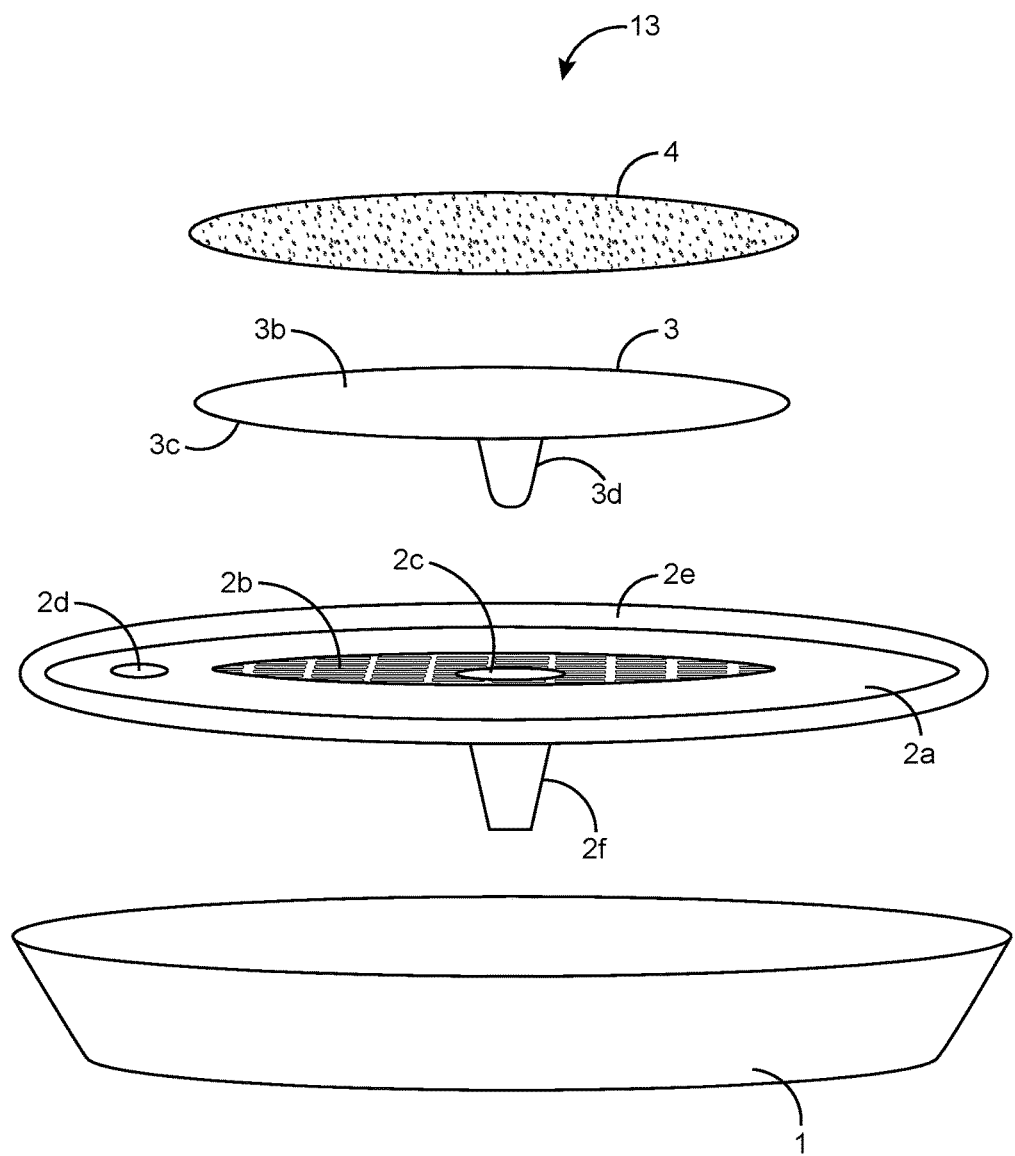
FIG. 9 shows an exploded view of another configuration of the present invention, illustrating a leg extending from a support structure to the reservoir of the sustained release irrigation apparatus.

FIG. 9 shows an exploded view of another configuration of the sustained release irrigation apparatus 13. The support structure 2 includes a flat circular lattice 2a. The diameter of the lattice 2a is smaller than the top circumference of the reservoir 1. At the center of the lattice 2a, there is an open grid 2b. The bottom surface 3c of the absorbent surface 3 is provided with wick like structures 3d that runs through the open grid 2b of the support structure 2. The area between the open grid 2b and the outside perimeter of the lattice 2a is covered by a thin layer or film of plastic. The support opening 2d is provided in this thin layer through which water can be added to the reservoir 1. The pivotal cap 14 (See FIG. 7) is attached to the support structure 2 to cover the support opening 2d. A perforated wall is provided around the perimeter of the lattice 2a. A support ledge 2e runs along the top of the perforated wall. The outside perimeter of the support ledge 2e extends beyond the perforated wall. The inside perimeter of the ledge extends inside the perforated wall. A leg 2f extends from the center of the lattice 2a to the bottom portion of the reservoir 1. There is an opening 2c in the open grid 2b to permit the leg 2f of the above support structure to fit through when support structures are stacked. The length of the leg 2f is such that, when the bottom of the leg 2f rests on the bottom portion of the reservoir 1, the support ledge 2e sets on the top edge of the reservoir 1. The leg 2f and the top edge of the reservoir 1 support the support structure 2. There may be more than one leg 2f. The leg(s) 2f taper towards their bottom so that the support structure 2 is stackable. The dimension of the absorbent surface 3 is such that it covers the open grid 2b. The wick like structure 3d of the absorbent surface 3 extends through the leg 2f to the bottom portion of the reservoir 1. The dimension of the water permeable top layer 4 is such that it covers the absorbent surface 3.

Figure 10:
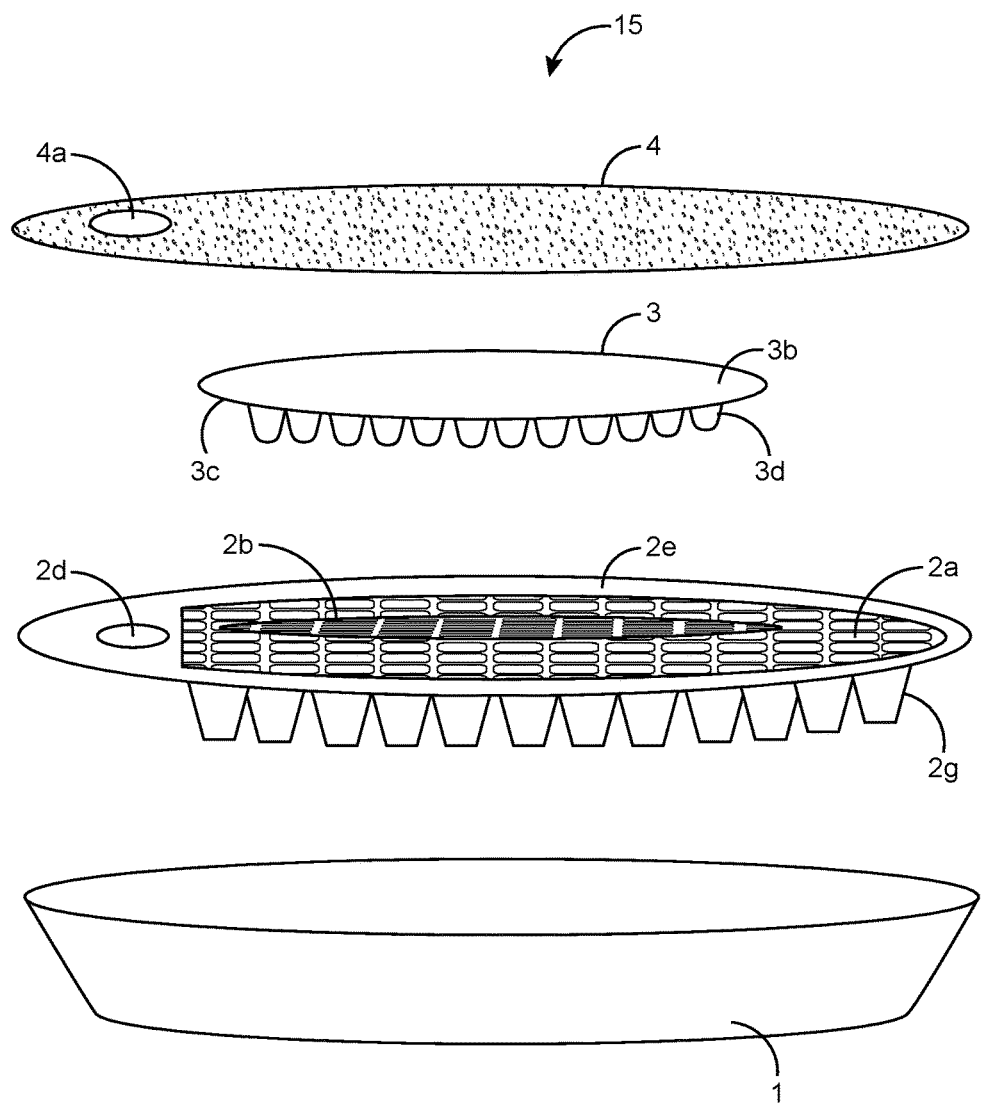
FIG. 10 shows an exploded view of another configuration of the present invention, illustrating a plurality of platform cells extending from the support structure of the sustained release irrigation apparatus.

FIG. 10 shows an exploded view of yet another configuration of the sustained release irrigation apparatus 15. The exploded view shows the arrangement of the reservoir 1, the support structure 2, the absorbent surface 3 and the permeable top layer 4. The support structure 2 is provided with a plurality of platform cells 2g. The top of the platform cells 2g is filled in by a thin layer of plastic to create a flat surface. Each of the platform cells 2g tapers towards its bottom so that the support structure 2 is stackable. The platform cells 2g are arranged and spaced such that the open grid 2b fits in the center of the support structure 2. The length of the platform cells 2g is such that when the base of the platform cells 2g rests on the bottom portion of the reservoir 1, the support ledge 2e sets on the top perimeter of the reservoir 1. The dimension of the absorbent surface 3 is such that it covers the open grid 2b. The wick like structure 3d of the absorbent surface 3 extends through the platform cells 2g to the bottom of the reservoir 1. The dimension of the permeable top layer 4 is such that it covers entire platform cells 2g. The top opening 4a in the water permeable top layer 4 accommodates the pivotal cap 14 (See FIG. 7). The outside perimeter of the permeable top layer 4 extends underneath the support ledge 2e.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

What is claimed is:

1. An apparatus comprising:
   a reservoir;
   a support structure positioned on the reservoir, the support structure including a plurality of perforations and supporting a potted plant thereon;
   an absorbent surface positioned on the support structure;
   a water permeable top layer positioned on the absorbent surface; and
   a top opening at the water permeable top layer for filling water into the reservoir;
   whereby the apparatus enables the water collected in the reservoir to reach the soil in the pot thereby providing water to the potted plant;
   wherein the top opening comprises a pivotally mounted pivotal cap having at least two configurations, wherein in said first configuration said fluid connection with a water source is closed and wherein in said second configuration said fluid connection with a water source is open.

2. The apparatus of claim 1 wherein the top opening positioned at the water permeable top layer is in fluid connection with a water source.

3. The apparatus of claim 1 wherein the reservoir comprises a fluid connection to the water permeable top layer and the soil inside the pot through at least one hole at a lower portion of the pot.

4. The apparatus of claim 1 wherein the absorbent surface exhibits capillary action.

5. The apparatus of claim 1 wherein the absorbent surface is removably located on the support structure and extends to the bottom portion of the reservoir through a plurality of perforations at the support structure.

6. The apparatus of claim 1 wherein the absorbent surface includes a plurality of wick like structure that runs through a lattice portion of the support structure.

7. The apparatus of claim 1 wherein the reservoir includes a base and a ledge.

8. The apparatus of claim 7 wherein the ledge includes an annular ring having an outer circumference and an inner circumference for replaceably retaining the water permeable top layer to the apparatus.

9. The apparatus of claim 8 wherein the inner circumference includes a first slot and a second slot to facilitate insertion and removal of the water permeable layer from the apparatus.

10. The apparatus of claim 1 wherein the water permeable top layer is in contact with the lower portion of the pot.

11. The apparatus of claim 1 wherein material for the reservoir is selected from the group consisting of plastic, polypropylene, high-density polypropylene, clay, ceramic, glass, or rust resistant metal.

12. A sustained release irrigation apparatus comprising:
a reservoir having a base and a ledge;
a support structure positioned on the reservoir that includes a plurality of perforations, the support structure being designed to support a potted plant thereon;
an absorbent surface positioned on the support structure;
a water permeable top layer positioned on the absorbent surface, the ledge of the reservoir being configured to form an annular ring for replaceably positioning the water permeable top layer on the apparatus; and
a top opening on the water permeable top layer for filling water into the reservoir;
whereby the water collected in the reservoir flows to the water permeable top layer and reaches the soil inside the pot utilizing the capillary action of water thereby providing water to the potted plant;
wherein the inner circumference includes a first slot and a second slot to facilitate insertion and removal of the water permeable layer from the sustained release irrigation apparatus.

13. The sustained release irrigation apparatus of claim 12 wherein the top opening and a water source are in a fluid connection relationship.

14. The sustained release irrigation apparatus of claim 12 wherein the reservoir through at least one hole at a lower portion of the pot contains a fluid connection between the water permeable top layer and the soil inside the pot.

15. The sustained release irrigation apparatus of claim 12 wherein the absorbent surface is replaceably placed on the support structure and extends to the bottom portion of the reservoir through the plurality of perforations at the support structure.

16. The sustained release irrigation apparatus of claim 12 wherein the annular ring has an outer circumference and an inner circumference.

17. The sustained release irrigation apparatus of claim 12 wherein the absorbent surface exhibits capillary action.

18. The sustained release irrigation apparatus of claim 12 wherein the absorbent surface includes an absorbent opening that coincides with the top opening of the water permeable top layer to facilitate flow of water from the water source to the bottom portion of the reservoir.

19. The sustained release irrigation apparatus of claim 12 wherein the absorbent surface includes a plurality of wick like structures that run through a lattice portion of the support structure.

20. The sustained release irrigation apparatus of claim 12 wherein the water permeable top layer is in contact with the lower portion of the pot.

21. A method for providing water to a potted plant utilizing a sustained release irrigation apparatus, the method comprising the steps of:
providing the sustained release irrigation apparatus having a reservoir, a support structure, an absorbent layer and a water permeable top layer;
positioning the reservoir having a base and a ledge on a surface;
positioning the support structure on the reservoir, the support structure being supporting a potted plant thereon and including a plurality of perforations;
positioning the absorbent surface on the support structure, positioning the water permeable top layer having a top opening on the absorbent surface, the top opening being designed to fill water from a water source into the reservoir;
positioning the potted plant on the water permeable top layer;
filling the reservoir with water through the top opening; and
enabling the water collected in the reservoir to flow upwards to the water permeable top layer and to reach the soil inside the pot utilizing the capillary action of water thereby making water available to the potted plant;
wherein the inner circumference includes a first slot and a second slot to facilitate insertion and removal of the water permeable layer from the apparatus.

22. The method of claim 21 wherein the water in the reservoir flows upwards to the water permeable top layer and then to the soil inside the pot through at least one hole at a lower portion of the pot.

23. The method of claim 21 wherein the absorbent surface includes an absorbent opening and extends to a bottom portion of the reservoir through the plurality of perforations at the support structure.

24. The method of claim 23 wherein the top opening coincides with the absorbent opening of the absorbent surface to facilitate flow of water from the water source to the bottom portion of the reservoir.

25. The method of claim 21 wherein the ledge of the reservoir is configured to form an annular ring for replaceably positioning the water permeable top layer on the apparatus.

26. The method of claim 25 wherein the annular ring has an outer circumference and an inner circumference.

27. The method of claim 21 wherein the absorbent surface exhibits capillary action.

28. The method of claim 21 wherein the absorbent surface includes a plurality of wick like structures that run through a lattice portion of the support structure.

29. The method of claim 21 wherein the water permeable top layer comes in contact with the lower portion of the pot.

* * * * *